United States Patent [19]

Yamaguchi

[11] 4,421,385
[45] Dec. 20, 1983

[54] POLYGON MIRROR FOR USE WITH LASER BEAM SCANNING APPARATUS INCLUDING MEANS FOR HANDLING AND STORING THE MIRROR

[75] Inventor: Ryoji Yamaguchi, Yutakamachi, Japan

[73] Assignee: Tokyo Shibaura Denki Kabushiki Kaisha, Kawasaki, Japan

[21] Appl. No.: 280,051

[22] Filed: Jun. 30, 1981

[30] Foreign Application Priority Data

Aug. 4, 1980 [JP] Japan .................................. 55-109740
Aug. 4, 1980 [JP] Japan .................................. 55-109741
Oct. 8, 1980 [JP] Japan .................................. 55-141006

[51] Int. Cl.³ .............................................. G02B 7/18
[52] U.S. Cl. ...................................... 350/299; 206/316
[58] Field of Search ............... 350/299, 6.8, 6.7, 6.5; 250/236; 206/316, 303

[56] References Cited

U.S. PATENT DOCUMENTS 3,532,213 10/1970 Schulz ................................ 206/316
4,173,282 11/1979 Stansbury et al. ................. 206/316

OTHER PUBLICATIONS

Kobayashi et al., Akira, *Toshiba Review*, Aug. 1972, pp. 24-28.

*Primary Examiner*—Jon W. Henry
*Attorney, Agent, or Firm*—Finnegan, Henderson, Farabow, Garrett & Dunner

[57] ABSTRACT

A rotatable mirror having a body with a regular polygon cross section, the faces of the polygon being mirror facets for scanning a laser beam, in combination with a container for storing the mirror. The container cooperates with elements of the mirror for preventing axial or lateral movement of the mirror in the container. Structure on the top surface of the body of the mirror both provides for handling the mirror without touching the facets and interacts with the cover of the container for securing the mirror when therein. A circular groove in the upper surface of the body of the mirror may receive a balance weight for compensating for any eccentricity between the centroid of the mirror and its axis of rotation.

8 Claims, 9 Drawing Figures

POLYGON MIRROR FOR USE WITH LASER BEAM SCANNING APPARATUS INCLUDING MEANS FOR HANDLING AND STORING THE MIRROR

BACKGROUND OF THE INVENTION

This invention relates to rotatable polygon mirrors for use with laser beam scanning apparatus including means for handling and storing a mirror.

An Ar+ ion laser generates a beam often used in laser beam scanning apparatus for transferring information from a stationary document to an imaging station. This beam is converted in the apparatus to a modulated beam and an unmodulated beam by optical elements. By scanning the unmodulated beam, a stationary document may be read at a reading station. An element for receiving diffuse beam reflections from the stationary document converts the variation in intensity of the reflections into electrical signals which represent the information on the document. The modulated beam, which is modulated by these electrical signals, is scanned to record an image on the imaging station. The image is developed and the developed image is transferred to a copy medium.

In the past, a galvanomirror scanner has been used to scan the beam. The galvanomirror has planar reflecting mirrors and the mirrors rotate around an axis within a certain rotation angle. Since the oscillatory period of the galvanomirror was limited according to the mechanics of it, the scanning speed was limited.

Instead of the galvanomirror, a rotatable polygon mirror may be used to increase the scanning speed. As is well-known, a polygon mirror includes a solid body having a cross section in the form of a regular polygon. The mirror has a plurality of reflecting flat facets for scanning the beam, the facets being successively turned through a position perpendicular to the axis of the polygon.

It is very important to handle the polygon mirror without touching the reflecting facets when it is being carried or mounted to a shaft of a motor. It is troublesome therefore when the polygon portion of a polygon mirror is grasped or touched during such handling.

If the centroid of the polygon mirror does not coincide with its axis, the mirror will vibrate during its rotation. Vibration of the mirror during rotation causes inaccurate scanning. Accordingly, it is necessary that the polygon mirror be rotated on the shaft of the motor without any eccentricity. It is difficult to adjust for any eccentricity in the rotation of the polygon mirror, for example, by mounting a balance weight on the shaft of the motor.

In case of manufacturing a plurality of polygon mirrors, the mirror forms are stacked with each polygon end in the direction of the axis of the polygon. When the facets of the polygon mirrors are then cut with a cutter, shavings tend to be left between the facets of the polygon mirrors. Accordingly, the outer edges of the facets can not be properly sharpened, the shavings causing roughness on the outer edges of the facets. Considerable difficulty, therefore, has arisen in the simultaneous manufacture of a number of polygon mirrors.

SUMMARY OF THE INVENTION

It is, therefore, an object of this invention to provide a rotatable polygon mirror which is easy to handle and is less susceptible to injury to its reflecting facets during the process of manufacture.

It is another object of this invention to provide a rotatable polygon mirror which is easily adjustable to obtain balance of rotation.

It is a further object of this invention to provide an improved rotatable polygon mirror which is capable of multiple production.

It is still a further object of the invention to provide a storage container which, in combination with the mirror, will prevent the facets of the mirror from injury during transportation or other non-use.

To attain these objects the invention includes in the combination of a polygon mirror for use with laser beam scanning apparatus and a container for the mirror wherein the body of the mirror has a regular polygonal cross section, each facet of the polygon having a mirror surface, and an axial aperture through the mirror body for receiving a driving rotatable shaft, the improvement comprising projection means on an upper surface of the body of the mirror for handling the mirror without contact with the mirror surfaces, a shaft fixed to the central inner surface of the container for receiving the aperture and securing the mirror body from lateral movement in the container, the side walls of the container being spaced from the mirror surfaces, a cover for the container, said cover contacting with said projection means, and retaining means cooperating between said cover and said fixed shaft for maintaining said cover in rigid contact with said projection means for securing the body of the mirror from axial movement.

The invention also includes a polygon mirror for use with laser beam scanning apparatus, the mirror comprising a body having a regular polygonal cross section, each facet of the polygon having a mirror surface, an axial aperture through the body for receiving a rotatable driving shaft, and projection means on the upper surface of the body for gripping during handling of the mirror without touching the facets. The projection means include removable pins threaded into the upper surface of a circular projection on the upper part of the body of the mirror. Alternatively, the circular projection is relatively higher for itself being grasped when handling the mirror.

The mirror also includes a ring coaxial with the aperture also extending upwardly from the upper surface of said body and surrounding said circular projection, the circular projection and the ring being separated by a groove, one wall of the groove forming at least a portion of the surface of the circular projection. The groove is provided for receiving a balance weight for any eccentricity between the rotational axis and the centroid of the mirror.

The invention still further includes a polygon mirror for use with laser beam scanning apparatus, the mirror comprising a body having a regular polygonal cross section, each facet of the polygon having a mirror surface, an axial aperture through the body for receiving a rotatable driving shaft, and a circular groove in the upper surface of the body coaxial with the aperture for receiving a balance weight for any eccentricity between the rotational axis and the centroid of the mirror.

DETAILED DESCRIPTION OF THE INVENTION

Figure 1:
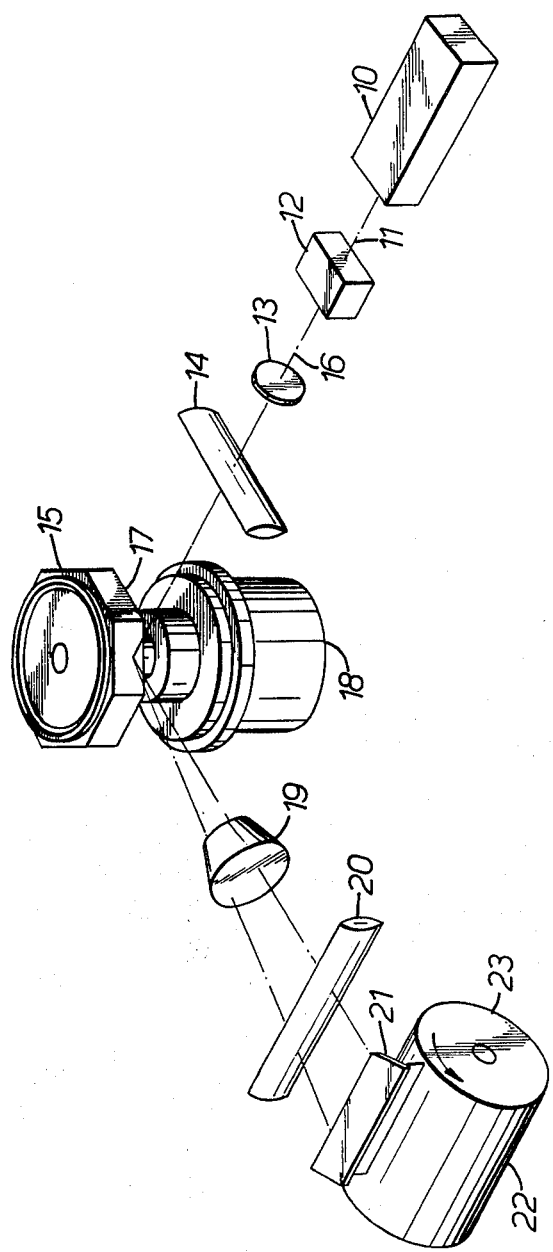
FIG. 1 is an overall perspective view of a laser beam scanning apparatus in which a rotatable polygon mirror according to this invention is used.

Referring to FIG. 1, a laser 10 generates a beam 11. A modulator 12 modulates the beam 11 in conformance with an electrical signal. A focusing lens 13 and a cylindrical lens 14 are located between the modulator 12 and a rotatable polygon mirror 15 in the path of the modulated beam 16. The modulated beam 16 is reflected by the polygon mirror 15. The polygon mirror 15 has a plurality of reflecting facets 17 around its periphery and scans the beam 16 as the mirror is rotated by a motor 18.

An imaging lens (i.e., fθ lens) 19 and a cylindrical lens 20 are located between the polygon mirror 15 and an angularly set mirror 21. The modulated beam 16, as reflected from the polygon mirror 15 and the mirror 21, imposes a latent image on a photosensitive layer 22 of a recording drum 23 as the beam 16 is scanned by the polygon mirror 15. The latent image imposed on the drum 23 corresponds to information modulated on the beam 11 by the modulator 12, as transmitted to the modulator. The latent image may be developed with toner particles and the developed image transferred to a copy medium. This apparatus, as described generally above, is well-known.

Figure 2:
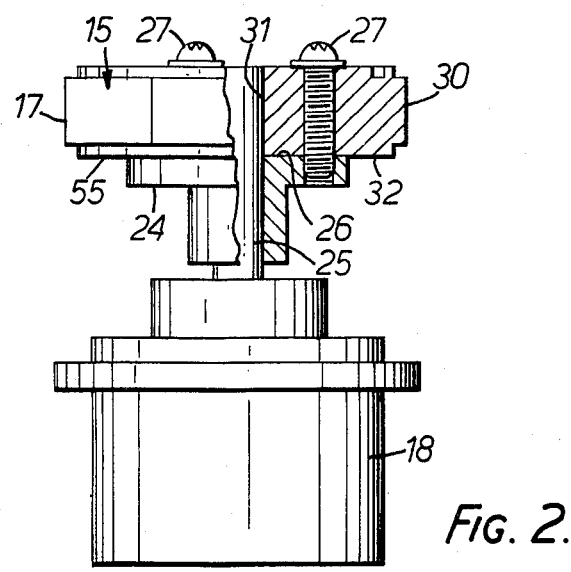
FIG. 2 is a front view, partly in section, of the rotatable polygon mirror of the invention.

Referring to FIG. 2, a holder 24 for the polygon mirror 15 is shrunk to fit on a shaft 25 of the motor 18. The body 30 of the polygon mirror 15 has a shaft hole 31 for receiving the shaft 25. The lower part 32 of the body 30 is securely positioned on the upper part 26 of the holder 24 by bolts 27.

Figure 3:
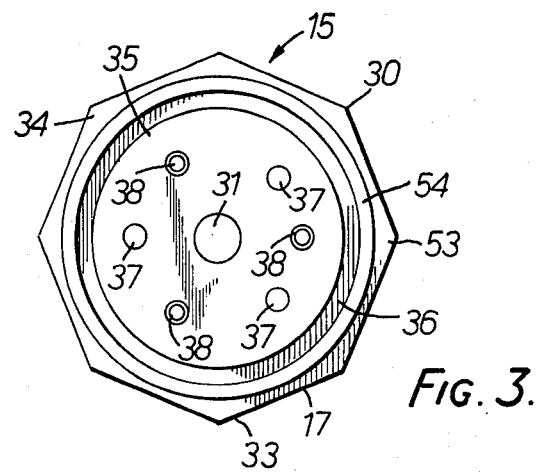
FIG. 3 is a plan view of the rotatable polygon mirror of FIG. 2.
Figure 4:
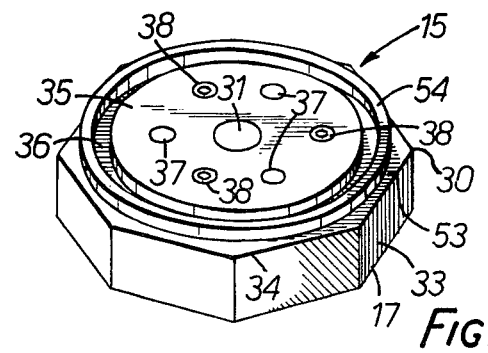
FIG. 4 is a perspective view of the rotatable polygon mirror of FIG. 2.

Referring to FIGS. 3 and 4, the sectional view perpendicular to the axis of the shaft 25 and the mirror 15 is a regular polygon. The body 30 is preferably made of aluminum and the sides 33 of the body forming the facets 17 are cut to a mirror surface by a diamond cutter (not shown). The sides 33 are then gilt with silicon to form the facets 17.

The upper surface 34 of the body 30 includes a circular projection 35 leaving a peripheral shoulder 53 on the upper surface. The projection 35 contains a circular coaxial groove 36 leaving a narrow ring 54 between the groove and the shoulder 53.

Figure 5:
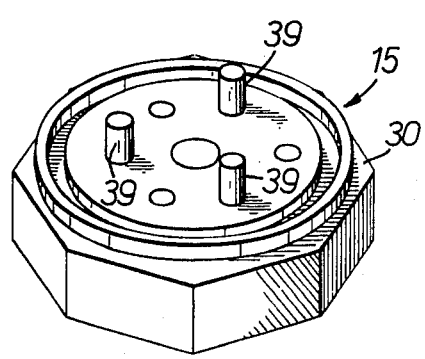
FIG. 5 is a perspective view of the rotatable polygon mirror of FIG. 2 with emplaced pins.

Through holes 37 are spaced around the shaft hole 31 for securing the mirror 15 to the holder 24 by the bolts 27. Threaded holes 38 are provided between the holes 37. Grip pins 39 (as shown in FIG. 5) are screwed into the holes 38. The holes 37 and 38 may be formed in a circle around the shaft hole 31 and spaced radially therefrom toward the groove 36.

As shown in FIG. 2, the bottom surface 32 of the polygon mirror 15 may include a circular projection 55 extending downwardly from the body 30. The projection 55, if used, is substantially equal in height and diameter to the projection 35.

Figure 6:
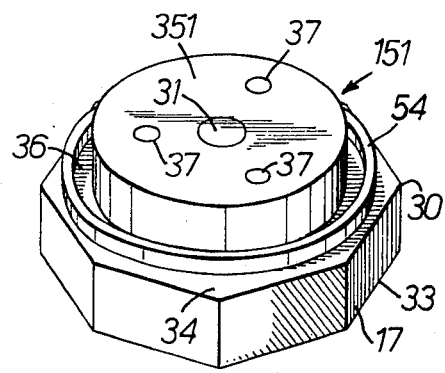
FIG. 6 is a perspective view of another embodiment of the rotatable polygon mirror according to this invention.

A second embodiment of the invention is shown in FIG. 6 in which like elements bear the same reference numerals. In this embodiment the means for handling the mirror 151 is the projection 351 on the upper surface of the mirror. In the mirror 151 the threaded holes 38 and pins 39 have been eliminated and the projection 351 is formed in sufficient height that it can be grasped by the fingers. The height of the ring 54 is substantially the same as that of the ring 54 of the embodiment of FIG. 2. The height of the projection 351 extends above the height of the ring 54 to provide a surface for secure grasping of the mirror 151. The groove 36 is retained for reasons presented hereinafter.

In the embodiment of FIG. 6, the projection 55 on the bottom surface of the mirror is ordinarily not used.

The circular groove 36 is provided for receiving a balance weight (not shown) to prevent vibrations of the mirror during rotation. The balance weight may be mounted in the proper position in the groove 36 to compensate for any eccentricity between the centroid and axis of rotation of the mirror. It is then easy to adjust the rotation balance of the mirror 15 by shifting the balance weight slightly along the groove 36. It is not necessary, therefore, to mount a balance weight on the shaft of the motor.

Figure 7:
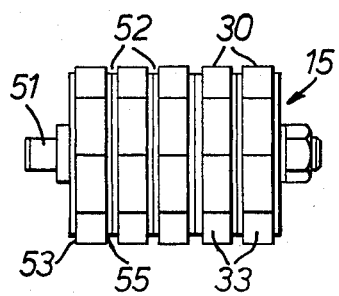
FIG. 7 is a side view of a plurality of stacked rotatable polygon mirrors according to the embodiment of FIG. 2.

Referring to FIG. 7, a plurality of the mirrors 15, of the embodiment of FIG. 2, is shown stacked one upon another with a tool 51 fitted through the shaft holes 31 of the mirrors. Each side 33 of the mirrors 15 is then cut by the diamond cutter. Each side 33 will thus become a mirror facet 17. When the sides 33 of the mirror 15 are cut, the shavings develop. The shavings are exhausted through grooves 52 formed by the height of the circular projection 35 of each body 30, the shoulder 53 and the outer periphery of the adjoining lower surface 32. If the lower projection 55 is used, the groove 52 will be correspondingly widened as shown in FIG. 7. Accordingly, the shavings are not caught between the ends 34 of the bodies 30. The outer edges of the facets 17 can then be sharpened perfectly.

Figure 8:
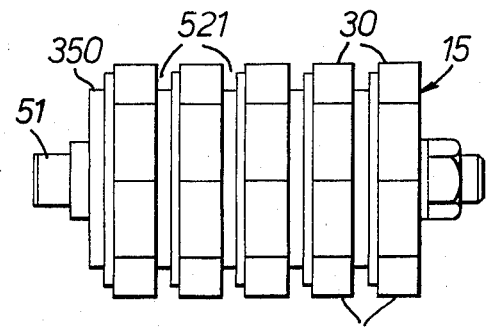
FIG. 8 is a side view of a plurality of stacked rotatable polygon mirrors according to the embodiment of FIG. 6.

When the mirrors 151, according to the embodiment of FIG. 6, are stacked for cutting the mirror surfaces, as shown in FIG. 8, the top of the projection 351 abuts the lower surface 32 of the body 30 of the next higher mirror forming a groove 521. The groove 521 also allows shavings to fall so that the mirror surfaces and edges may be cut cleanly.

Figure 9:
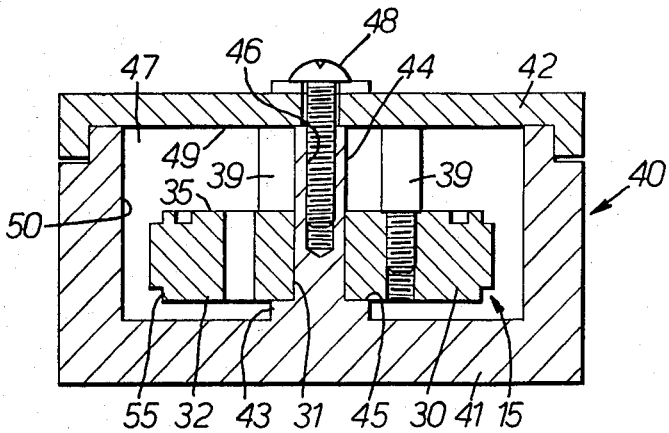
FIG. 9 is a sectional view of the rotatable polygon mirror, according to the embodiment of FIG. 2, with a container including a cover.

The completed mirror 15 or 151 may be kept in a container as shown in FIG. 9, when the mirror is being transported or otherwise not being used. The container 40 has a bottom 41 and a wall with an inner surface 50, forming a cavity 47, and a cover 42 for the cavity. A boss 43 is provided in the cavity 47 at the center of the bottom 41. A shaft 44 projects upwardly at the center of the boss 43 for fitting into the shaft hole 31 when a mirror is placed in the container 40. The lower surface 32 of the body 30 will then rest on the upper surface 45 of the boss 43. The shaft 44, therefore, prevents lateral movement of the mirror in the container.

The shaft 44 has a hollow threaded portion 46 for receiving a bolt 48 securing the cover 42 in position over the cavity 47. If the mirror is formed as shown in FIG. 2, and the pins 39 are emplaced, as shown in FIG. 5, the inner surface 49 of the cover 42 contacts the upper ends of the grips pins 39, spacing the cover from the mirror 15. Consequently, the mirror 15 is securely contained in the container 40. The grip pins 39 are, therefore, also used as spacers between the inner part 49 of the cover 42 and the upper surface 34 of the body 30.

When the mirror 15 is being carried or is being secured to the shaft 25 of the motor 18 or being removed from the shaft, the grip pins 39 are threaded into the holes 38 of the mirror. The body of the mirror 15, therefore, is not touched by hand, but handled only by means of the grip pins 39. Accordingly, the facets 17 of the mirror 15 are not damaged by being touched.

When the mirror 15 is being transported, or otherwise not being used, the mirror is preferably kept in the container 40 with the grip pins 39 remaining threaded into the mirror. Since the grip pins 39 are then used as spacers, the mirror 15 is securely stored in the container 40. Since the mirror 15 can not move in the container 40, the facets 17 of the mirror are not damaged by contacting the inner wall 50 of the container 40.

When the mirror is formed according to the embodiment of FIG. 6, the upper surface of the projection 351 is contacted by the inside surface 49 of the cover 42. When the bolt 48 is tightened, the mirror 151 is securely held against axial vibration in the container 40.

It will be apparent to those skilled in the art that various modifications and variations can be made in the polygon mirror of the present invention and in the construction of the container without departing from the scope or spirit of the invention. Thus, it is intended that the present invention cover the modifications and variations of this invention provided they come within the scope of the appended claims and their equivalents.

What is claimed is:

1. A polygon mirror for use with laser beam scanning apparatus comprising:
   a body having a regular polygonal cross section, each facet of the polygon having a mirror surface;
   an axial aperture through said body for receiving a rotatable driving shaft;
   projection means on the upper surface of said body for gripping, during handling of the mirror without touching said facets, said projection means including a circular projection coaxial with said aperture;
   a ring also coaxial with said aperture and also extending upwardly from the upper surface of said body and surrounding said circular projection, said circular projection and said ring being separated by a groove, one wall of said groove forming at least a portion of the surface of the circular projection; and
   wherein said circular projection and said ring have substantially the same height.

2. The polygon mirror of claim 1 wherein said projection means also includes removable pins threaded into the upper surface of said circular projection for grasping during handling of the mirror.

3. In the combination of a polygon mirror for use with laser beam scanning apparatus and a container for the mirror wherein the body of the mirror has a regular polygonal cross section, each facet of the polygon having a mirror surface, and an axial aperture through the mirror body for receiving a driving rotatable shaft, the improvement comprising:
   projection means on an upper surface of the body of the mirror for handling the mirror without contact with the mirror surfaces;
   a shaft fixed to the central inner surface of the container for receiving the aperture and securing the mirror body from lateral movement in the container, the side walls of the container being spaced from the mirror surfaces;
   a cover for the container, said cover contacting said projection means; and
   retaining means cooperating between said cover and said fixed shaft for maintaining said cover in rigid contact with said projection means for securing the mirror from axial movement.

4. The improvement of claim 3, wherein said projection means includes pins threaded into the upper surface of the mirror body for gripping during handling of the mirror, the upper ends of said pins also contacting the inner surface of said cover when said mirror is stored in said container.

5. The improvement of claim 4, wherein said pins are easily removable from the upper surface of the mirror body after the mirror body is mounted on the driving shaft.

6. The improvement of claim 3, wherein said projection means includes a circular projection projecting from the upper surface of the mirror body for gripping during handling of the mirror, the upper surface of said circular projection also contacting the inner surface of said cover when said mirror is stored in said container.

7. The improvement of claim 3, wherein said fixed shaft further comprises:
   a boss for receiving the mirror body thereon, said boss being located at the lower part of said fixed shaft.

8. The improvement of claim 3, wherein said retaining means includes a bolt inserted through said cover and threaded into said fixed shaft.

* * * * *